United States Patent [19]

Cooper et al.

[11] Patent Number: 5,182,707
[45] Date of Patent: Jan. 26, 1993

[54] APPARATUS FOR RECORDING REAGENT TEST STRIP DATA BY COMPARISON TO COLOR LIGHTS ON A REFERENCE PANEL

[75] Inventors: Tommy G. Cooper, Friendswood; Ross E. Smith, Houston; Emil S. Macha, Sugarland, all of Tex.

[73] Assignee: Healthdyne, Inc., Marietta, Ga.

[21] Appl. No.: 558,062

[22] Filed: Jul. 23, 1990

[51] Int. Cl.$^5$ .................... G06F 15/00; G06F 15/42
[52] U.S. Cl. ........................ 364/413.11; 364/413.02; 422/55
[58] Field of Search .............. 364/413.02, 413.11; 422/55, 56, 57, 58, 61, 68.1, 82.05; 435/7.1, 287–89, 291

[56] References Cited

U.S. PATENT DOCUMENTS

4,056,359 11/1977 Janin ............................ 23/259
4,523,852 6/1985 Bauer ............................ 356/421

Primary Examiner—Robert Weinhardt
Assistant Examiner—Andrew Bodendorf
Attorney, Agent, or Firm—Jerry R. Seiler

[57] ABSTRACT

An apparatus for recording analysis of a reagent test strip having a plurality of color blocks for testing different constituents of a fluid, comprises a reference panel having a plurality of visually distinguishable and calibrated color areas or spots, a plurality of first lights for designating the testing of a different constituent or parameter, a plurality of second lights each located adjacent a different color spot, a cavity or space adjacent groups of color spots, detection optical detector for detecting the presence of the reagent strip positioned in the space, and a microcomputer for recording and storing test results and having means for directing sequential testing of the different parameters and for turning the lights on and off during the sequential testing. The apparatus includes switches for signaling the microcomputer to record and store the test data and for turning the apparatus on and off. The invention includes a process for operating the apparatus.

44 Claims, 4 Drawing Sheets

APPARATUS FOR RECORDING REAGENT TEST STRIP DATA BY COMPARISON TO COLOR LIGHTS ON A REFERENCE PANEL

BACKGROUND OF THE INVENTION

Test strips, usually made of inert plastic or paper having a reagent absorbed on the strip surface for testing the presence or concentration of constituents of a body fluid are commonly used in medical diagnosis and treatment. For example, reagent strip testing of different conditions in urinalysis is used for measuring pH, sugar or glucose, protein, ketone bodies, bilirubin and urobilinogen, hemoglobin, and the like. The reagents on the strip are activated when the strip is exposed to the fluid and given sufficient time to develop, with the reagent developing a color or color intensity corresponding to the presence and/or concentration of the constituent present in the body fluid being tested. The use of such reagent test strips is especially beneficial for assisting the management of medication dosage or therapy for patients with chronic diseases, for example, in diabetics for monitoring blood glucose levels in managing insulin therapy, for monitoring urine glucose for screening gestational diabetes and for measuring proteins in toxemia detection during pregnancy.

A common method for reading a reagent paper color uses resealable vials having calibrated color areas on the exterior label corresponding to different concentration levels for the tested parameters. In another technique, the patient inserts the exposed reagent strip into an electronic colorimeter which converts the reagent paper color to a quantitative measurement of the parameter concentration. A disadvantage of such techniques is the requirement of the patient to record the measured information for later review by a clinician or physician. Moreover, patient compliance for punctual test performance and subsequent reporting is problematic. Often, patients forget to promptly take the test or record the test results accurately. Although electronic reagent color measuring devices, for example, Accu-Check II and Merlin produced by Boehringer-Mannheim Diagnostics provide for improved capture and storing of the reagent test readings, these devices measure only one parameter and thus are not useful for testing a plurality of parameters, which are provided on some reagent papers. Moreover, some electronic reagent color measuring devices require use of a calibration code for each vial of strips and if the code is misplaced, the entire vial of strips is rendered useless.

SUMMARY OF THE INVENTION

The apparatus of the present invention is designed to obviate the disadvantages of the previously described techniques and devices by providing means for testing, recording, and storing a plurality of different parameters or conditions to be tested on a single reagent test strip. The apparatus incorporates a microcomputer or microcontroller which prompts a user through a sequential series of comparative color measurements to record single or multi-parameter reagent test strip readings. Utilizing visual comparative color discrimination to make the measurement, no calibration is required to compensate for variation in the reagent paper colors. Moreover, the apparatus includes a replaceable overlay reference panel printed with calibrated color areas preferably arranged in rows and columns corresponding to the color blocks of a particular test strip, and a matrix of lights also preferably arranged in rows and columns, and a microcomputer programmed for directing the user through the sequential operation for easily selecting and recording the test data. In the preferred embodiment, the apparatus includes a visual readout or printout capability, and may also be provided with modem and transmission equipment for sending the test data to a remote station for further analysis and drug or medical therapy or prescription by a clinician or physician. These, as well as other advantages, will be evident from the following detailed description.

DETAILED DESCRIPTION OF THE INVENTION

Figure 1:
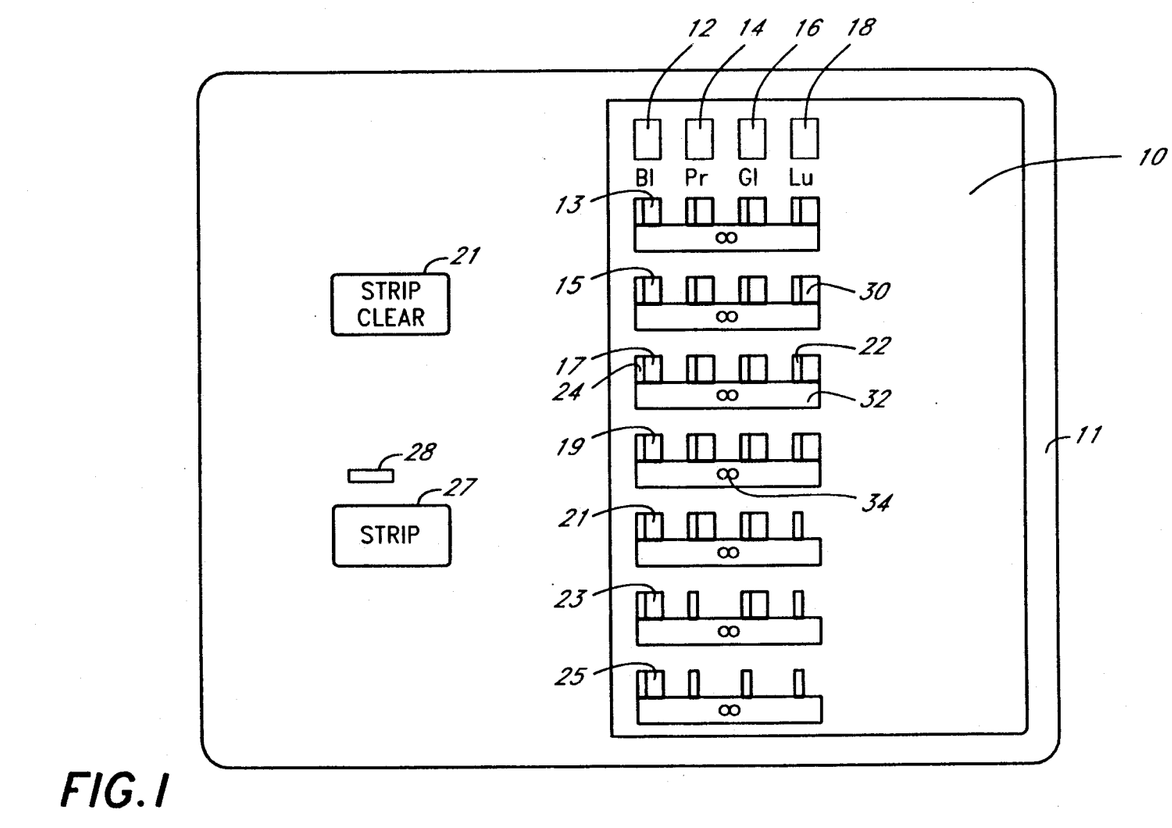
FIG. 1 is a front view of an example of a typical reference panel of the apparatus of the invention illustrating features and components thereof.

Referring first to FIG. 1, panel 10 of apparatus is shown which illustrates the features and components of the invention used in carrying out the sequential multiple parameter or condition testing. Panel 10 includes a plurality of parameter lights 12, 14, 16 and 18 also sometimes collectively referred to hereinafter as "first lights", arranged preferably in a row for directing sequential testing of different conditions or parameters. Lights 12, 14, 16 and 18 illustrate an example of an apparatus capable of performing and recording tests of four different parameters. The panel also includes a plurality of color spots 30, preferably arranged groups of rows and columns, although other groupings of the color spots may be desired and are within the purview of this invention. In the embodiment shown, the color spots are arranged in parameter test groups of four substantially vertical columns, each column extending below one of the parameter lights 12, 14, 16 or 18. The color spots are also arranged in rows of four, each row composed of the visually distinct and calibrated color spots of the different parameters. Thus, for example, under parameter light 12, color spots 13, 15, 17, 19, 21, 23 and 25 comprise different visually detectable intensity of the same general color for the test parameter of the first test to be carried out and recorded by the apparatus. The specific arrangement of the colors in any one column is not particularly critical, but preferably will be progressive from dark to light color intensity to assist the user or patient in selecting the correct color intensity for that specific parameter test. Thus, for example, if the test color block on the reagent strip (not shown) for the first test is red, the color intensity of color spot 13 may be a lighter shade of red than that of color spot 15, which is lighter than color spot 17, etc., or vice versa, if so desired. However, for any given test parameter, the color spots need not necessarily be of one color. For example, the reagent color strip uses different colors for that parameter test in addition to different intensities of a single color.

Adjacent each color spot 30 is a level light 22, sometimes referred to hereinafter as a "second light". The level light identifies which color spot is being selected during a test procedure, as will be explained more fully hereinafter.

The panel 10 also contains a plurality of cavities or spaces 32 one space adjacent each row of color spots for positioning the reagent strip during testing. Each space is preferably sized to be slightly wider than a test strip to allow the strip to be easily positioned into the space. Each space is preferably located adjacent or abutting the lower edge of each row of color spots to assist the user in comparing the colors on the strip against the color spots 30. Moreover, when a test strip is positioned in a space 32, each color block on the strip will be aligned in the column of color spots to be compared for that particular test parameter. With the groups of color spot columns and rows arranged to correspond to the same spacial arrangement of the color blocks on the test strip, the user will be able to easily compare and identify more precisely and accurately the correct corresponding color or color intensity to be selected in that test parameter procedure.

The preferred lights to be used in the matrix of parameter lights 12, 14, 16 and 18 and level lights 22, adjacent each of the different color spots, may be light emitting diodes (LED), for example, a green Panasonic LN342GP although any suitable color light may be used. The lights are also preferably rectangular to be consistent with the square shaped color spots and to correspond with the shape of color blocks on a reagent strip.

The matrix of lights are used to signal the status of a test in progress, color spot selection and to direct the user sequentially to the test parameters. For example, a parameter light is conveniently flashed on and off to indicate the parameter and column of color spots presently being tested. One of the level lights 22 adjacent a color spot is also preferably flashed on and off during a measurement cycle to indicate the color spot in the column directly above (adjacent) the space in which the test strip has been positioned. Thus, when the user places the test strip in a space, the level light adjacent the color spot directly above the test strip in the column of the parameter being tested will also flash. The panels may also include a retainer (not shown) for holding a test strip positioned in a space 32. Once a user has selected a color spot, i.e., finds a color spot that most closely resembles the color block on the strip being tested, switch 27 is momentarily actuated, and the level light adjacent the selected color spot is turned on continuously. All of the lights are turned on and off under the control of the microcomputer.

Cooperating with and preferably exposed in or adjacent each cavity or space 32, is an optical detector or photointerruptor 34 for detecting the presence of a test strip in the space. Such a photointerruptor responds only when a strip has been positioned or located in a space. An example of a preferred photointerruptor is a Sharp GP2A11, which is preferably focused for highest sensitivity. A preferred photointerruptor also uses a light modulation technique to eliminate false detection due to high intensity or changes in ambient light levels. The output of the photointerruptor is a discreet, high or low voltage indicating, respectively, detection or non-detection of a strip. The outputs of the photointerruptors 30 are interfaced to the microcomputer which monitors their status. However, other equivalent means known to those skilled in the art for identifying the presence or absence of a test strip in a respective space may be used. For example, mechanical means such as a cover or similar device which may be moved, for example on a hinge, or otherwise lifted or removed thereby actuating a lever or pin for detecting the presence of a test strip in the space may be used. However, the use of the preferred photointerruptors provides for a most convenient detection of a strip in the space and is preferred in the present apparatus.

Reference panel 10 also includes switch 27 cooperating with the microcomputer, for turning the apparatus on and off, initiating the test sequence, and to capture and record the color spot selected during the test procedure. Although a plurality of different switches could be used for different ones or combinations of such functions, preferably, a single switch 27 is quite suitable and convenient for carrying out the test procedure, as will be further understood hereinafter. The apparatus preferably also includes a timing means cooperating with switch 27 and the microcomputer for terminating the test procedure if the sequential steps are not followed within a prescribed time period and otherwise to prevent error or inaccuracies in carrying out the test procedure within the prescribed program and sequential manner. A status light 28 is also preferably provided adjacent switch 27 for signaling the user of the status of the computer program in the microcomputer and sequential testing. For example, in the preferred embodiment, once the user turns on the apparatus by momentarily actuating switch 27, status light 28 flashes for a preselected time period, for example, sixty seconds, to allow and ensure that the reagents in the test strip are fully developed, and to remind the user not to continue testing until the status light stops flashing. A preferred status light will be multi-colored, for example, orange for indicating a pre-selected time delay to be observed by the user, green to indicate that further testing may be continued, and red to signal an error in the test procedure. However, coloring and operation of such a status light is optional, and other flashing patterns and colors may be used. A second switch 21 may be provided to intentionally terminate a test prior to completion when the user so desires and is preferably a time delay switch requiring actuation for a preselected time period. Such a switch may be conveniently labeled to designate such a function. However, other functions of the procedure may be incorporated into switch 21 if desired, or it may be eliminated. The switches 21, 27 are preferably single contact, momentary action type switches, suitable for fabrication using membrane switch technology. The switches are interfaced to the microcomputer which monitors the switch status as well as operates status light 28. A suitable LED such as a Panasonic LN142WP38 may be used for status light 28.

Figure 2A:
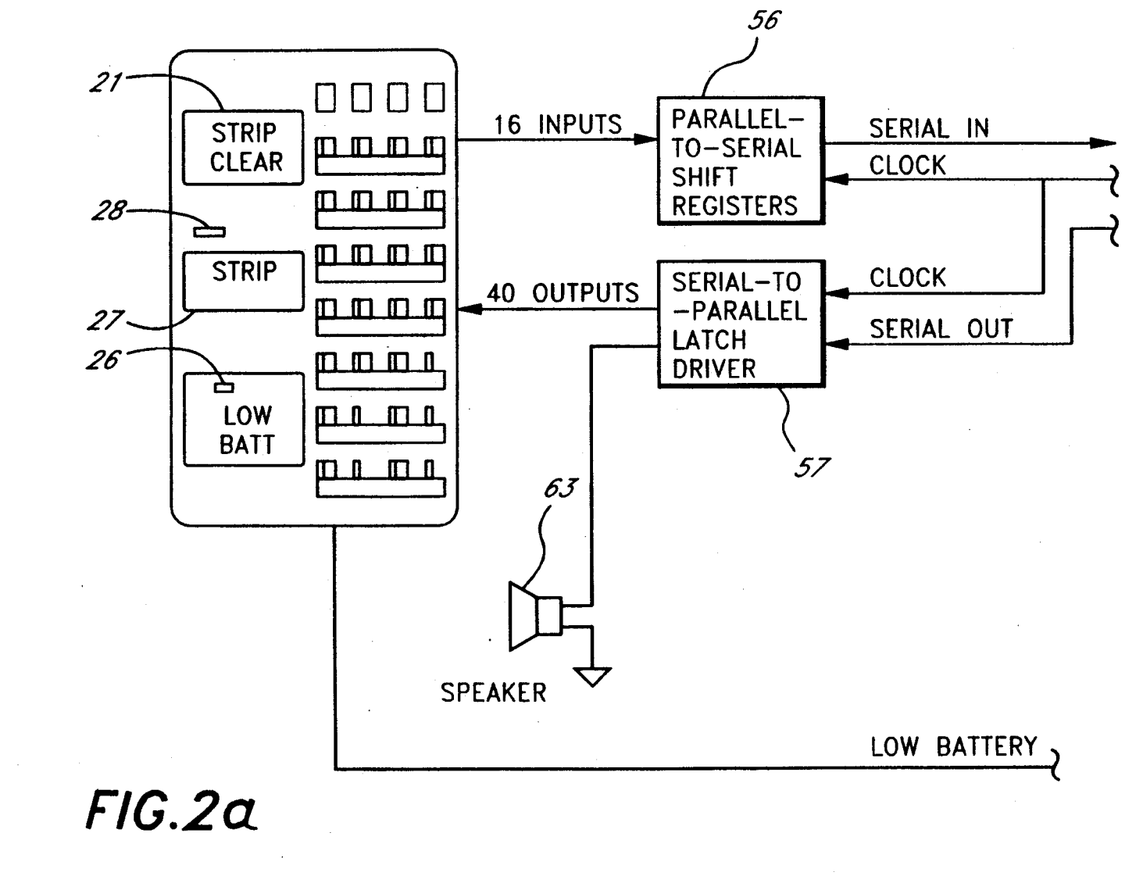
FIG. 2 is a block diagram schematically illustrating components of the apparatus of the invention.
Figure 2B:
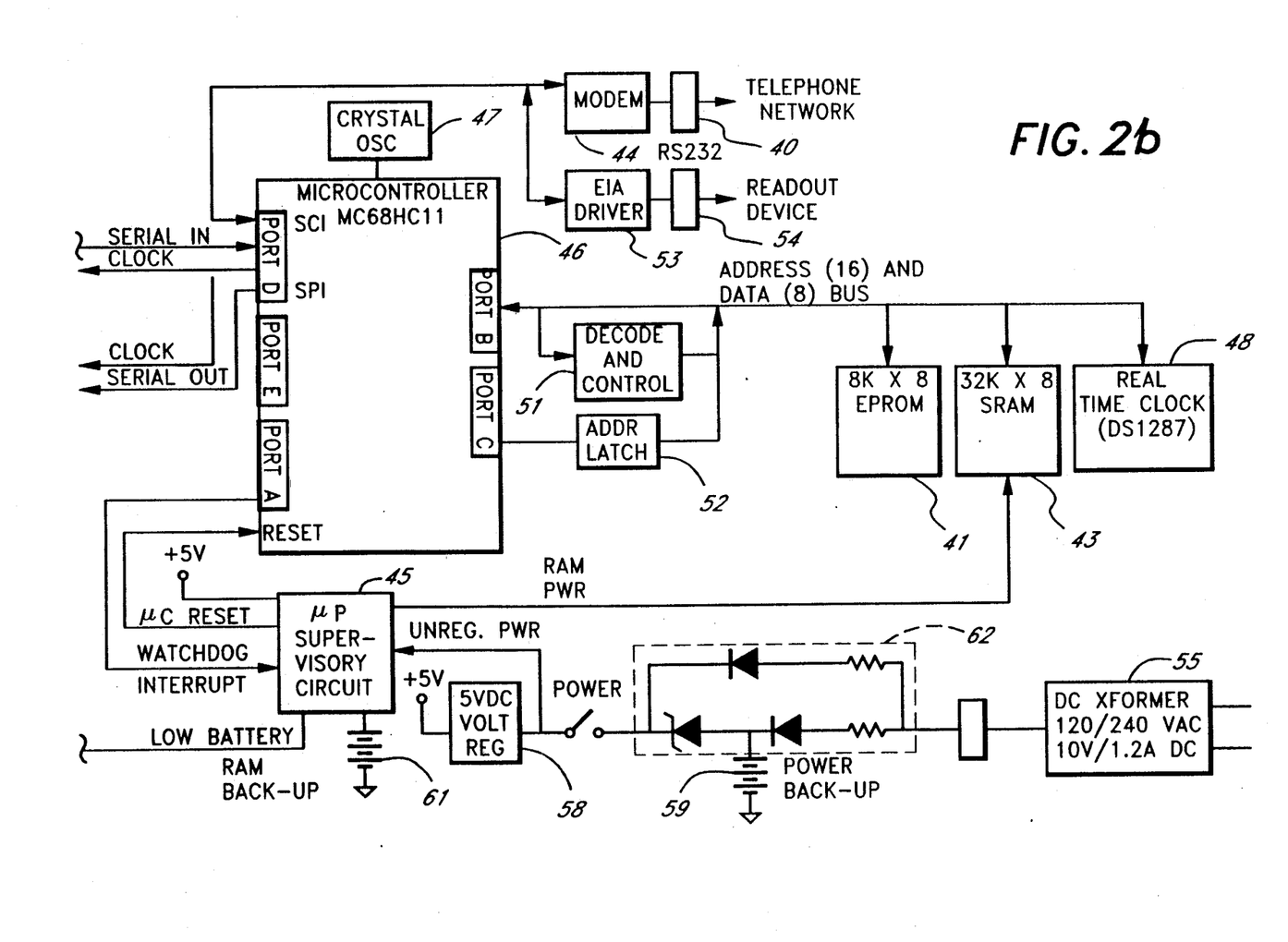

Referring now to FIG. 2, the apparatus of the invention includes a microcomputer suitably including a microcontroller 46 such as a Motorola MC68HC11A0. The microcontroller is programmed for controlling the operational sequence in performing the test functions and recording and storing the data of the completed test results. The program software located in memory 41 such as, for example, an 8K×8 EPROM, incorporates a state machine which sequences the program through a series of defined measurement states. As is well known in a state machine, progress from one state to another depends on the current state and set of inputs.

The Motorolla MC68HC11 microcomputer 46, an 8-bit machine, is used in the preferred embodiment shown in FIG. 2, and includes integral memory, parallel input/output (I/O) ports, timers, serial I/O ports and other features. A crystal oscillator 47 is used to generate the system clock for the microcomputer. Two of the parallel I/O ports along with an address latch 52 and decode and control circuit 51 are used to form a multiplexed address and data bus for transferring data between the microcontroller and the 8-kilobyte erasable programmable read-only-memory (EPROM) 41 (27C64), the 32-kilobyte static-random-access-memory or (SRAM) 43 (6225), and the real-time clock (RTC) 48 (Dallas Semiconductor DS 1287). The EPROM is used to store the machine code program for the microcomputer. The SRAM is used to store measured data and temporary information. The RTC provides time and date information for storage with each set of measured data.

A microprocessor supervisory circuit 45 (Maxim MAX691CPE) is used to provide several functions for ensuring controlled operation of the microcomputer system. It controls the microcomputer reset during power-up, monitors a watchdog interrupt line from the microcontroller for periodic activity, resets the microcontroller if the watchdog interrupt is inactive for more than a predetermined time period, and monitors the unregulated power from a power back-up battery 59 or a DC transformer 55. Upon detection of a low power condition, supervisory circuit 45 will also turn on a low battery light 26 and alert the microcontroller which responds by preventing the start of a new sequence. Supervisory circuit 45 also preferably detects when power is turned off and switches the power to SRAM 43 to a RAM back-up battery 61.

The system is designed to operate from AC power or from battery power. The AC power is converted to a DC voltage via the DC transformer. The battery is preferably a rechargeable nickel-cadmium (Nicad) battery. A diode network 62 automatically switches between the two sources. The battery 59 is in a charging mode whenever the DC transformer is providing power. A voltage regulator 58 (National Semiconductor LM29403) converts the power from the battery or DC transformer to +5 volts DC to operate the apparatus.

The photointerruptors, lights, switches and a speaker 63 on panel 10 are interfaced to microcontroller 46 via the serial-peripheral-interface (SPI) port. The SPI is an 8-bit register in the microcontroller which simultaneously shifts its contents to the SERIAL OUT line while shifting in information from the SERIAL IN line. The data transfer is synchronized by the CLOCK line. The STRIP and STRIP CLEAR switches and the photointerruptors are interfaced to a set of two 8-bit parallel-to-serial shift registers 56 (74HC165) connected in series. The lights and speaker are interfaced to a set of four 10-bit serial-to-parallel latch drivers 57 (Sprague UCN5810A) connected in series. The microcontroller periodically (for example every 13 milliseconds) requests the SPI to refresh the outputs to the lights and speaker and to input the condition of the switches and photointerruptors.

The serial-communications-interface (SCI) port on the microcontroller is a programmable universal asynchronous receive transmit (UART) type port, integral to the microcomputer for sending and receiving data, operating under standard serial communication protocols and frequencies providing a transmit (TXD) and receive (RXD) data lines to interface with an EIA driver 56 (Maxim MAX236CNG) and modem 44 (Sierra Semiconductor SC11004). The EIA driver translates the 5 volt logic levels on the TXD and RXD lines to the voltage levels compatible with a RS232 interface and allows measured data to be transferred to a readout device, such as a personal computer or other type of computer. A modem 44 provides for data communications over a telephone network (not shown).

Figure 3:
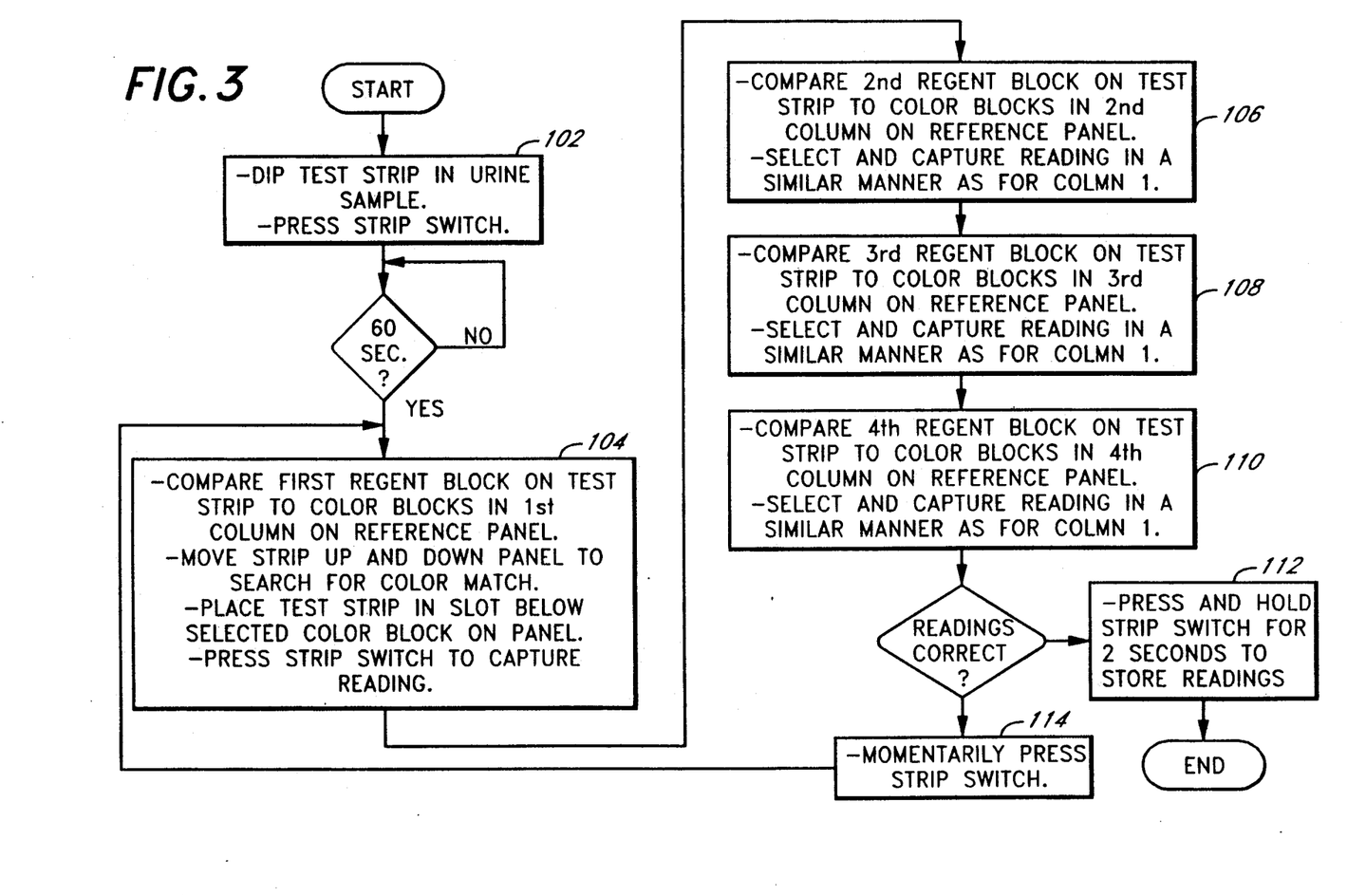
FIG. 3 is an operational flow chart further describing the use of the apparatus of the invention.

Referring also to FIG. 3 of the drawings, operation and use of the apparatus of the invention is as follows. From an initial state, to start testing at state 1, block 102, the patient or user dips the reagent test strip (not shown) in the body fluid or other material to be tested, such as a sample of urine or blood, and momentarily presses or actuate switch 27 on the panel 10 (FIGS. 1 and 2). At that time, the apparatus is turned on and status light 28 flashes orange for a preselected time period, for example, sixty seconds cycling between 0.5 seconds on and 1.0 seconds off, indicating that the test strip reagent is being developed, and alerting the user that further testing cannot be initiated. Where the apparatus is provided with an audible alarm or signaling means, it may be sounded, to indicate start of the reagent development time delay.

At the end of the sixty seconds, state 2 (block 104) begins and status light 28 turns off, the audible alarm sounds, for example, beeping twice, first parameter light 12 flashes, for example 0.5 seconds on and 0.5 seconds off, and the first column of level lights adjacent color spots 13–25, are activated. The patient then observes the reagent strip which by now has developed colors for the different parameters, observing the first parameter, corresponding to the first color block at the left end of the strip, and compares it with the color and/or color intensity of reference panel color spots aligned in the first left hand column below blinking parameter light 12 to determine which of the color spots approximates closest the color and color intensity of the first color block on the strip.

During the visual comparison the user may move the strip from level to level, i.e., place the strip below different ones of the rows of color spots to examine and compare the color intensity of the strip color block with the color spot on the reference panel. During the first parameter test, when the strip is placed in one of the spaces 32, the photointerruptor exposed in the space is activated causing the level light adjacent the color spot in the left hand column to flash synchronously with parameter light 12. For example, if the reagent strip was positioned in space 32 in the first parameter test, level light 24 flashes. Once the user has decided which of the color spots along the column under flashing parameter light 12 is closest in color and color intensity to the corresponding left end color block of the reagent test strip, and with the strip positioned in the appropriate space directly beneath that selected color spot and the adjacent level light flashing, that color spot is recorded by momentarily pressing switch 27, and level light adjacent the selected color spot stops flashing and remains turned on. Parameter light 12 turns off, and parameter light 14 begins flashing to indicate that the second test parameter is in progress.

Moving to state 4, block 106, the user then observes the second color block of the reagent test strip, and compares it with the second column of color spots below flashing parameter light 14. The user may again move the strip along the rows of color spots on the reference panel to observe the visual color and color intensity distinction and similarity between the color spots in the second column with the second color spot in the test strip. When the patient places the test strip in one of the spaces 32, the light adjacent the color spot in the second column directly above the space in which the test strip is positioned flashes. When the patient is satisfied that the color spot in the second column most closely compares with the color and intensity of the second color block of the test strip, with that adjacent color spot light flashing, the patient again momentarily actuates switch 27 to record that selected color spot in the apparatus and initiate program state 5, block 108. The flashing level light adjacent the selected color spot is turned on, the second parameter light 14 is turned off, and third color parameter light 16 begins flashing. Similarly, momentary actuation of switch 27 records the selected color level of the third reagent block and starts state 6, described in block 110. In an apparatus provided with means for testing additional parameters these progressive sequential stages of the program will continue with the patient selecting a color spot in the next successive column beneath the flashing parameter light and matching the color spot with the closest color and color intensity the color block of the reagent test strip as previously described until all of the tests have been completed.

In a preferred embodiment of the apparatus, the microcomputer includes a means for energizing the level light adjacent a previously selected color spot in the column of color spots being tested. Thus, for example, if during a previous test the patient had selected color spot 17 in the first parameter test, in the next subsequent test with a parameter light 12 flashing, level light 24 would flash, reminding the patient of the previous selection. When the patient then selects a different color spot for the first parameter test and actuates switch 27 to record the new selected color spot, the level light next to the earlier selected color spot light is turned off and the new level light turned on.

In the test and apparatus illustrated herein, when the final parameter has been tested, and the last color spot selected by momentarily pressing switch 27, the patient should observe that a color spot light remains lit in each of the four columns, and that all four of the parameter lights have been turned off. In this program state, strip light 28 begins flashing green indicating that all of the parameters have been measured. The apparatus may include a means for allowing the user to reconsider and change a selection in any of the parameters. For example, such means may provide for momentarily contacting switch 27 as shown in block 114 whereby first parameter light 12 will flash along with the previously selected color spot light with subsequent momentary contacts of switch 27 causing sequential flashing of reference lights 14, 16 and 18, To change a previously selected color spot in any of the columns, the user and positions the reagent strip in a space adjacent a new desired color spot in the column under a flashing reference light and momentarily presses switch 27.

When the user is satisfied that all of the selected color spots are correct, actuating switch 27 for a preselected length of time other than a momentary actuation, for example two seconds, will terminate the program processing and result in storing of the selections in the microcomputer memory as shown in blocks 112. At this state, an audible tone may sound and status light 28 may flash a preselected number of times to indicate successful data storage and termination of the test procedure. The strip read mode is deactivated and returned to the initial state.

The apparatus also preferably includes a timer device, for example, real time-clock 48, illustrated in FIG. 2, or a similar means for completing a test, once started, without undue interruptions, which could result in error in reading and comparing the test strip colors with the color spots on the reference panel due to drying, aging, etc. For this purpose, RTC 48 cooperating with microcontroller 46 will measure a time for testing at each parameter or condition of a preselected time, for example, sixty seconds to allow the patient to make the selections for each of the respective parameters. If a selection is not made during the sixty seconds, the test is aborted, and the error condition indicated by status light 28 flashing red to so alert the user. An audible indicator may also warble or otherwise sound continuously and remain activated with the status light on until cleared by the user momentarily pressing switch 27. Thereafter, the program is returned to an initial state and the user may proceed again at the start of the test procedure as previously described.

The preferred apparatus also includes a removable and replaceable reference panel cover 11 with the calibrated color spots printed on its face. Such a feature may also provide for different tests using different reagent test strips having different color or color intensities for testing different body fluids. Also, such a replaceable reference panel cover obviates problems of color spot fading, marking or other deterioration. Reference panel cover 11 includes cut-outs or windows providing exposure of the various matrix lights and test strip spaces or cavities.

As previously noted, the apparatus may include means for directly reading the test results incorporating a readout device such as a printer so that the user may have a permanent record of the test results. In addition, the apparatus may include or cooperate with modem 44 to convert data signals received from the microcomputer for transmission through telephone lines or otherwise transmitted to a modem and readout or printing device at a remote location, for example, at a clinic, or a physician's office. Such a remote diagnosis is particularly valuable in saving both physician, technician and patient time not only in testing, but in administering medical care to the patient, especially where immediate care is not required.

Although the panel shown in the figures and described herein illustrates four parameters or conditions to be tested, the apparatus may be designed to test any number of parameters with the appropriate number of reference lights, color response and adjacent level lights being incorporated in the device, along with the appropriate programmed microcomputer. Moreover, the apparatus may be used to test only a single parameter, if desired. These, as well as other features and modifications within the purview of the invention disclosed herein will be evident to those skilled in the art.

What is claimed:

1. Apparatus for recording the analysis of a reagent strip having a plurality of color blocks for testing a plurality of different parameters, said apparatus comprising a panel member including a color chart area comprising a plurality of color groups corresponding to different color blocks of a developed reagent strip, and including two or more set of a plurality of visually distinguishable color spots, each set for testing one of said plurality of different parameters;
a plurality of first lights each for signaling the testing of one of said plurality of different parameters;
a plurality of second lights each located adjacent a different one of said color spots; and a space adjacent each group of said color spots for positioning said reagent strip and detection means cooperating therewith for detecting said reagent strip in said space;

a microcomputer having means for recording test results for each of said plurality of different parameters, means for directing sequential testing of said plurality of different parameters, and light energizing means for turning said lights on and off during said sequential testing; and means for recording and storing selected color spots.

2. Apparatus of claim 1 wherein each of said color groups comprises a row of said color spots.

3. Apparatus of claim 2 wherein each of said color spots in a color group is for testing a different parameter.

4. Apparatus of claim 1 wherein each of said sets of color spots is for testing a different one of said different parameters.

5. Apparatus of claim 4 wherein said color chart area comprises two or more rows of said color spots and wherein each different color spot of each of said sets of color spots is located in a different row.

6. Apparatus of claim 5 having a said space and cooperating detection means adjacent to each of said different rows.

7. Apparatus of claim 6 wherein the color spots of each of said sets are aligned generally axially, respectively.

8. Apparatus of claim 7 wherein each of said first lights is aligned axially with the set of color spots for testing one of said different parameters.

9. Apparatus of claim 1 wherein said detection means comprises an optical detector exposed in said space.

10. Apparatus of claim 1 including switching means for turning said apparatus on and for enabling said microcomputer to start said testing.

11. Apparatus of claim 10 including a third light cooperating with said switching means for visually indicating start and termination of said testing.

12. Apparatus of claim 10 including means cooperating with said switching means for delaying said start of the testing for a preselected time delay period after turning the apparatus on.

13. Apparatus of claim 12 including a third light cooperating with said switching means and means for energizing said third light to signal during the preselected time delay period.

14. Apparatus of claim 13 including means for sequentially energizing said first lights for signaling a user to conduct successive tests for said plurality of different parameters.

15. Apparatus of claim 14 including means for energizing a first one of said first lights following said preselected time delay period.

16. Apparatus of claim 14 including means for turning said third light off following the preselected time delay, and for energizing a first one of said first lights when said third light is turned off.

17. Apparatus of claim 16 wherein the color spots of each respective set are aligned substantially axially relative to one of said first lights.

18. Apparatus of claim 16 including means for energizing one of said first lights for signaling said strip in one of said spaces.

19. Apparatus of claim 18 including means for energizing one of said second lights adjacent to a color spot axially aligned with a signaling first light in response to said reagent strip positioned in said space adjacent said color spot.

20. Apparatus of claim 19 wherein said means for recording and storing selected color spots comprises said switching means and said microcomputer.

21. Apparatus of claim 20 including means for signaling completion of testing of all of said different parameters.

22. Apparatus of claim 21 wherein said means for signaling completion of testing comprises said third light.

23. Apparatus of claim 22 including a readout device cooperating with said microcomputer having visual display means for observing results of said testing.

24. Apparatus of claim 22 including a modem cooperating with said microcomputer for transmitting results of said testing and a remote readout device in communication therewith for receiving signals from said modem and having means for visually displaying said results.

25. Apparatus of claim 22 including timer means cooperating with said switching means and said microcomputer for storing data of said selected color spots and turning said apparatus off in response to activation of said switching means for a preselected length of time.

26. Apparatus of claim 1 including a removable panel cover having said color chart imprinted thereon and having a plurality of ports therein for exposing said first and second lights and said spaces.

27. Apparatus of claim 1 including means for sequentially energizing said first lights for signaling a user for successive testing of said different parameters.

28. Apparatus of claim 1 including means for energizing a second light in response to said detection means detecting said reagent strip in said space.

29. Apparatus of claim 1 wherein said microcomputer includes means for energizing one of said second lights for signaling the detection of said strip in a space adjacent to a color spot different than the previous sequentially selected color spot.

30. Apparatus of claim 1 wherein adjacent color spots of each of said sets have a different visually detectable color intensity.

31. Apparatus of claim 1 including a readout device cooperating with said microcomputer having visual display means for observing results of said testing.

32. Apparatus of claim 1 including a printing device cooperating with said microcomputer having means for printing results of said testing.

33. Apparatus of claim 1 including a modem cooperating with said microcomputer for transmitting results of said testing and a remote readout device in communication therewith for receiving signals from said modem and having means for visually displaying said results.

34. Apparatus of claim 1 including means for turning said apparatus off in response to actuation of said switching means for a preselected length of time.

35. Apparatus for testing and recording test results of a reagent test strip having a set of color blocks thereon, each color block for designating a different test parameter, said apparatus comprising:

a reference panel having two or more groups of color spots, each group corresponding to the set of color blocks on said test strip;

a plurality of first signaling means each for designating a different test parameter;

a plurality of second signaling means, each for designating a different color spot; microcomputer means for sequentially testing said different test parameters and operating said first signaling means sequentially during said testing; and switching means cooperating with said microcomputer means for recording test results for each of said different test parameters.

36. Apparatus of claim 35 including means for detecting a test strip positioned adjacent to said reference panel.

37. Apparatus of claim 36 including a space adjacent each of said group of color spots for positioning said test strip and wherein said detection means detects said test strip in said space.

38. Process for operating an apparatus of claim 37 comprising exposing said reagent test strip to a composition to be tested, visually comparing the color blocks on said test strip with the color spots on said reference panel, sequentially positioning said test strip in an area adjacent a group of color spots having a color spot most closely approximating the color of a color block of the different test parameters, and sequentially activating said switching means to record the test results of each of said test parameters.

39. Process for operating an apparatus, for testing and recording test results of a reagent test strip having a set of color blocks thereon, each color block for designating a different test parameter, and having a reference panel having two or more groups of color spots, each group corresponding to the set of color blocks on said test strip; a plurality of first signaling means each for designating a different test parameter; a plurality of second signaling means, each for designating a different color spot; microcomputer means for sequentially testing said different test parameters and operating said first signaling means sequentially during said testing; and switching means cooperating with said microcomputer means for recording test results for each of said different test parameters, said process comprising exposing said reagent test strip to a composition to be tested, visually comparing the color of color blocks thereon with the color spots on said reference panel, and sequentially actuating said switching means for recording the test results for each of said different parameters.

40. A process for testing and recording the test results of a reagent strip having a plurality color blocks thereon, each color block for testing a different parameter of a material, utilizing an apparatus for recording the analysis of a reagent strip having a plurality of color blocks for testing a plurality of different parameters, said apparatus having a panel member including a color chart area comprising a plurality of color groups corresponding to different color blocks of a developed reagent strip, and including two or more sets of a plurality of visually distinguishable color spots, each set for testing one of said plurality of different parameters; a plurality of first lights each for signaling the testing of one or said plurality of different parameters; a plurality of second lights each located adjacent a different one of said color spots; and a space adjacent each group of said color spots for positioning said reagent strip and detection means cooperating therewith for detecting said reagent strip in said space; a microcomputer having means for recording test results for each of said plurality of different parameters, means for directing sequential testing of said plurality of different parameters, light energizing means for turning said lights on and off during said sequential testing; and switching means for turning said apparatus on and for enabling said microcomputer to start said testing; said process comprising:

exposing said testing strip to said material, and actuating said switching means;

visually comparing a first color block with said color spots and positioning said test strip in a space adjacent the color spot having a color intensity visually closest to said first color block color and actuating said switching means;

visually comparing a second color block with said color spots and positioning said test strip in a space adjacent the color spot having a color intensity visually closest to said second color block and actuating said switching means; and sequentially comparing the color of any remaining color blocks with said color spots, respectively, positioning said test strip in a space adjacent the color spot having a color intensity visually closest to a compared remaining color block, and actuating said switching means, respectively.

41. A reagent strip comparator apparatus, comprising:

a plurality of visual discriminators arranged in a matrix wherein each column of said discriminators defines a parameter and each row of said discriminators defines a condition dependent upon a selected parameter, optical detection means for detecting said reagent strip adjacent to a row of said discriminators, and feedback means responsive to said optical detecting means for signalling the parameter to test.

42. A reagent strip recording apparatus for sequentially testing and recording selected color areas of said reagent strip having an arrangement of visually detectable color areas on said reagent strip, said apparatus comprising a reference panel having a plurality of color spots corresponding to said color areas signalling means for designating sequential testing of said color areas, and switching means and microcomputer means cooperating therewith for recording selected color spots.

43. Apparatus of claim 42 wherein said color spots are arranged in groups corresponding to the arrangement of said color areas.

44. Apparatus of claim 43 including means for signaling sequential recording of selected color spots.

* * * * *